(12) United States Patent
Barron

(10) Patent No.: US 8,602,466 B2
(45) Date of Patent: Dec. 10, 2013

(54) TELESCOPING VEHICLE SAFETY GUARD

(75) Inventor: Mark B. Barron, Los Angeles, CA (US)

(73) Assignee: Public Transportation Safety International, Corp., Los Angeles, CA (US)

( * ) Notice: Subject to any disclaimer, the term of this patent is extended or adjusted under 35 U.S.C. 154(b) by 0 days.

(21) Appl. No.: 13/457,008

(22) Filed: Apr. 26, 2012

(65) Prior Publication Data

US 2012/0286528 A1 Nov. 15, 2012

Related U.S. Application Data

(60) Provisional application No. 61/483,819, filed on May 9, 2011.

(51) Int. Cl.
*B60R 19/00* (2006.01)

(52) U.S. Cl.
USPC .......................................................... 293/58

(58) Field of Classification Search
USPC ............. 293/58, 1, 142, 102; 404/6; 280/748, 280/849; 256/13.1
See application file for complete search history.

(56) References Cited

U.S. PATENT DOCUMENTS

| | | | |
|---|---|---|---|
| 2,406 A | 12/1841 | Naglee et al. |
| 3,450 A | 2/1844 | Tolles |
| 39,011 A | 6/1863 | Gillen |
| 45,316 A | 12/1864 | Castor |
| 55,663 A | 6/1866 | Jenkins |
| 79,600 A | 7/1868 | Riley |
| 159,632 A | 2/1875 | Blackford, et al. |
| 190,563 A | 5/1877 | Day |
| 195,738 A | 10/1877 | Wood |
| 217,676 A | 7/1879 | Brown |
| 220,082 A | 9/1879 | Mahon |
| 223,473 A | 1/1880 | Brisac |
| 226,970 A | 4/1880 | Brisac |
| 238,258 A | 3/1881 | Stephenson |
| 339,857 A | 4/1886 | Clarke |
| 340,561 A | 4/1886 | Creager |
| 346,762 A | 8/1886 | Marston |
| 347,269 A | 10/1886 | Goldsmith |
| 354,831 A | 12/1886 | French |
| 364,230 A | 6/1887 | Durfee |
| 381,881 A | 4/1888 | Mahon |
| 394,975 A | 12/1888 | Hachenberg |
| 470,362 A | 3/1892 | Nagele |
| 488,353 A | 12/1892 | Gamage et al. |
| 489,320 A | 1/1893 | Mortimer et al. |
| 489,848 A | 1/1893 | Clarke |

(Continued)

FOREIGN PATENT DOCUMENTS

DE 2220674 11/1973
DE 243677 3/1987

(Continued)

*Primary Examiner* — Kiran B Patel
(74) *Attorney, Agent, or Firm* — Diederiks & Whitelaw PLC

(57) ABSTRACT

A safety guard for a vehicle, such as a school or transit bus, tractor trailer or the like-type vehicle, includes a front guard positioned at an angle in front of a wheel of the vehicle that will function to push individuals and other animate objects lying in the path of the vehicle out of the path of the wheels for safety purposes, while being mounted for telescoping movement to protect the safety guard from damage upon abutting an inanimate object during operation of the vehicle.

17 Claims, 4 Drawing Sheets

(56) References Cited

U.S. PATENT DOCUMENTS

| | | |
|---|---|---|
| 490,772 A | 1/1893 | Mahon |
| 523,208 A | 7/1894 | Kallauner |
| 547,707 A | 10/1895 | Breul |
| 551,700 A | 12/1895 | Walier |
| 587,060 A | 7/1897 | Noraconk |
| 709,208 A | 9/1902 | Crandal |
| 711,569 A | 10/1902 | Hollis |
| 734,968 A | 7/1903 | Schwinger, Jr. |
| 806,143 A | 12/1905 | Hoey |
| 821,863 A | 5/1906 | Derr |
| 826,768 A | 7/1906 | Craley |
| 914,985 A | 3/1909 | Sprint |
| 962,323 A | 6/1910 | Deemer, et al. |
| 1,002,114 A | 8/1911 | Barnes |
| 1,011,214 A | 12/1911 | Lillich |
| 1,013,078 A | 12/1911 | Simon |
| 1,050,405 A | 1/1913 | Gelder |
| 1,060,475 A | 4/1913 | McGowan |
| 1,065,055 A | 6/1913 | Lawrence |
| 1,072,965 A | 9/1913 | Manteau |
| 1,091,409 A | 3/1914 | West |
| 1,095,017 A | 4/1914 | Minnich |
| 1,099,058 A | 6/1914 | Kruckow |
| 1,104,647 A | 7/1914 | Finkelstein |
| 1,157,460 A | 10/1915 | Throckmorton |
| 1,218,583 A | 3/1917 | Rubenstein |
| 1,222,828 A | 4/1917 | Weinberg |
| 1,230,911 A | 6/1917 | Loeb |
| 1,232,835 A | 7/1917 | Ostrowiecki |
| 1,295,692 A | 2/1918 | Cantlon |
| 1,283,428 A | 10/1918 | Tookey |
| 1,325,690 A | 12/1919 | Cantlon |
| 1,325,705 A | 12/1919 | Sleeman |
| 1,397,825 A | 11/1921 | Thompson |
| 1,411,254 A | 4/1922 | Braucci |
| 1,412,524 A | 4/1922 | Howard |
| 1,416,610 A | 5/1922 | Cochran |
| 1,464,205 A | 8/1923 | Kuno |
| 1,523,623 A | 1/1925 | Altman |
| 1,530,017 A | 3/1925 | Souliotis |
| 1,581,041 A * | 4/1926 | De Barrios ............... 293/58 |
| 1,586,786 A | 6/1926 | Davies |
| 1,691,018 A | 11/1928 | Scott |
| 1,700,645 A | 1/1929 | Ritenour |
| 1,737,952 A | 12/1929 | Storch et al. |
| 1,742,148 A | 12/1929 | Ritenour |
| 1,748,304 A | 2/1930 | Miyaoka |
| 1,805,933 A | 5/1931 | Victor |
| 1,885,611 A | 11/1932 | Lilley |
| 1,899,937 A | 3/1933 | Brown |
| 1,936,054 A | 11/1933 | Harzbecker |
| 2,017,227 A * | 10/1935 | Barnhart .................. 280/849 |
| 2,078,679 A | 4/1937 | Golphin |
| 3,784,226 A | 1/1974 | Wilfert et al. |
| 3,784,244 A | 1/1974 | Emi |
| 3,794,373 A | 2/1974 | Manning |
| 3,809,167 A | 5/1974 | Glider |
| 3,913,963 A | 10/1975 | Persicke |
| 3,956,111 A | 5/1976 | Manfredi |
| 4,076,295 A | 2/1978 | Gutman |
| 4,077,141 A | 3/1978 | Stedman |
| 4,093,290 A | 6/1978 | Pearson |
| 4,103,918 A | 8/1978 | Salden |
| 4,203,623 A | 5/1980 | Fenner et al. |
| 4,221,410 A | 9/1980 | Dawson |
| 4,249,632 A | 2/1981 | Lucchini et al. |
| 4,362,310 A | 12/1982 | Goodall |
| 4,620,745 A | 11/1986 | Jacobs |
| 4,688,824 A | 8/1987 | Herring |
| 4,763,939 A | 8/1988 | Zhu |
| 4,877,266 A * | 10/1989 | Lamparter et al. .......... 280/762 |
| 4,930,823 A | 6/1990 | Rivera |
| 5,462,324 A * | 10/1995 | Bowen et al. .............. 293/15 |
| 5,735,560 A * | 4/1998 | Bowen et al. .............. 293/15 |
| 5,836,399 A * | 11/1998 | Maiwald et al. ............ 172/509 |
| 6,193,278 B1* | 2/2001 | Ward et al. ............... 280/848 |
| 2009/0218787 A1 | 9/2009 | Jones et al. |
| 2011/0018289 A1 | 1/2011 | Barron |

FOREIGN PATENT DOCUMENTS

| | | |
|---|---|---|
| GB | 153794 | 11/1920 |
| GB | 284874 | 2/1928 |
| GB | 809624 | 2/1959 |
| JP | 04-176784 | 6/1992 |

* cited by examiner

TELESCOPING VEHICLE SAFETY GUARD

CROSS REFERENCE TO RELATED APPLICATIONS

The present invention claims the benefit of U.S. Provisional Patent Application Ser. No. 61/483,819 entitled "Telescoping Vehicle Safety Guard" filed May 9, 2011.

BACKGROUND OF THE INVENTION

1. Field of the Invention

The present invention pertains to the art of vehicle safety devices and, more particularly, to a safety device mounted beneath a body of a vehicle and including a guard portion which is supported in front on a wheel set of the vehicle, in a compliant, telescoping manner, for both deflecting animate objects from in front of the vehicle wheels and protecting the guard portion against damage by abutment of the safety guard with certain inanimate objects during operation of the vehicle.

2. Discussion of the Prior Art

Buses are commonly employed for various transportation purposes. For instance, buses are widely employed in metropolitan mass transit systems. Unfortunately, there are inherent dangers associated with the operation of buses. Many of the most serious of these injuries are a result of individuals being run over by the bus, such as when a person slips and falls in the road adjacent a wheel of the bus and the bus crushes a limb or other body part of the individual. Correspondingly, inanimate objects can also be crushed.

To address these concerns, it has been proposed in the art to mount a safety guard directly in front of wheels on a bus to establish a safety barrier between the wheels and objects. More specifically, as represented by U.S. Pat. Nos. 5,462,324 and 5,735,560, it is known to mount a safety barrier to undercarriage structure of a vehicle, such as a bus, with the safety barrier including a lower edge extending directly along a ground surface. The safety barrier is fixedly supported at various locations, such as to axle, frame and/or suspension structure. The safety barrier is angled such that, if an object is encountered during movement of the bus, the safety barrier forces the object out from under the vehicle to a position out of the path of the vehicle wheels.

In addition to mass transit buses, school buses are widely employed in connection with transporting students for educational purposes. Of course, still other types of buses also exist. Certainly, each of these additional types of buses, as well as other types of vehicles such as those used in the trucking industry, can benefit from incorporating safety guards. Regardless of the type of vehicle to which the safety guard is mounted, serious damage can be done to the guard if the guard abuts an inanimate object, such as a curb, pole, mailbox or the like, during operation of the vehicle. Depending on the level of damage, the safety guard may not even be able to perform its desired safety function, thereby requiring replacement. Given the monetary cost and time associated with replacing of these safety guards, this scenario is undesirable.

Based on the above, there exists the need for a more feasible mounting arrangement for a vehicle underbody safety guard. In particular, there is seen to exist a need for a safety barrier mounting arrangement which will enable safety guards to be readily mounted to a wide range of vehicles in a manner which will protect the safety guard from significant damage when unintentionally abutting an inanimate object during operation of the vehicle, thereby prolonging the useful and effective life of the safety guard.

SUMMARY OF THE INVENTION

The present invention is directed to providing a safety guard for a vehicle, such as a school or transit bus, tractor trailer or the like-type vehicle, including a frontal guard positioned at an angle in front of a wheel of the vehicle that will function to push individuals and other animate objects lying in the path of the vehicle out of the path of the wheels for safety purposes, while being mounted for telescoping movement to protect the safety guard from damage upon abutting an inanimate object during operation of the vehicle. That is, the safety guard is positioned close enough to the ground so that, if an animate object is encountered, the safety barrier will force the object out from under the vehicle and out of the wheel path, while also being mounted so as to telescope or shift inwardly of the vehicle in the event the guard engages a relatively immovable inanimate object, such as a curb, pole, mailbox or the like, during operation of the vehicle. The shifting of the frontal guard is controlled such that the guard can only move along a defined axis. In addition, the frontal guard is resiliently mounted so as to be forced to rebound back to its fully operational position after any shifting based on engaging an inanimate object. In this manner, the safety guard can still fully perform its desired safety function, yet is protected from significant, undesirable and unintended damage which could affect its performance.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE PREFERRED EMBODIMENTS

Figure 1:
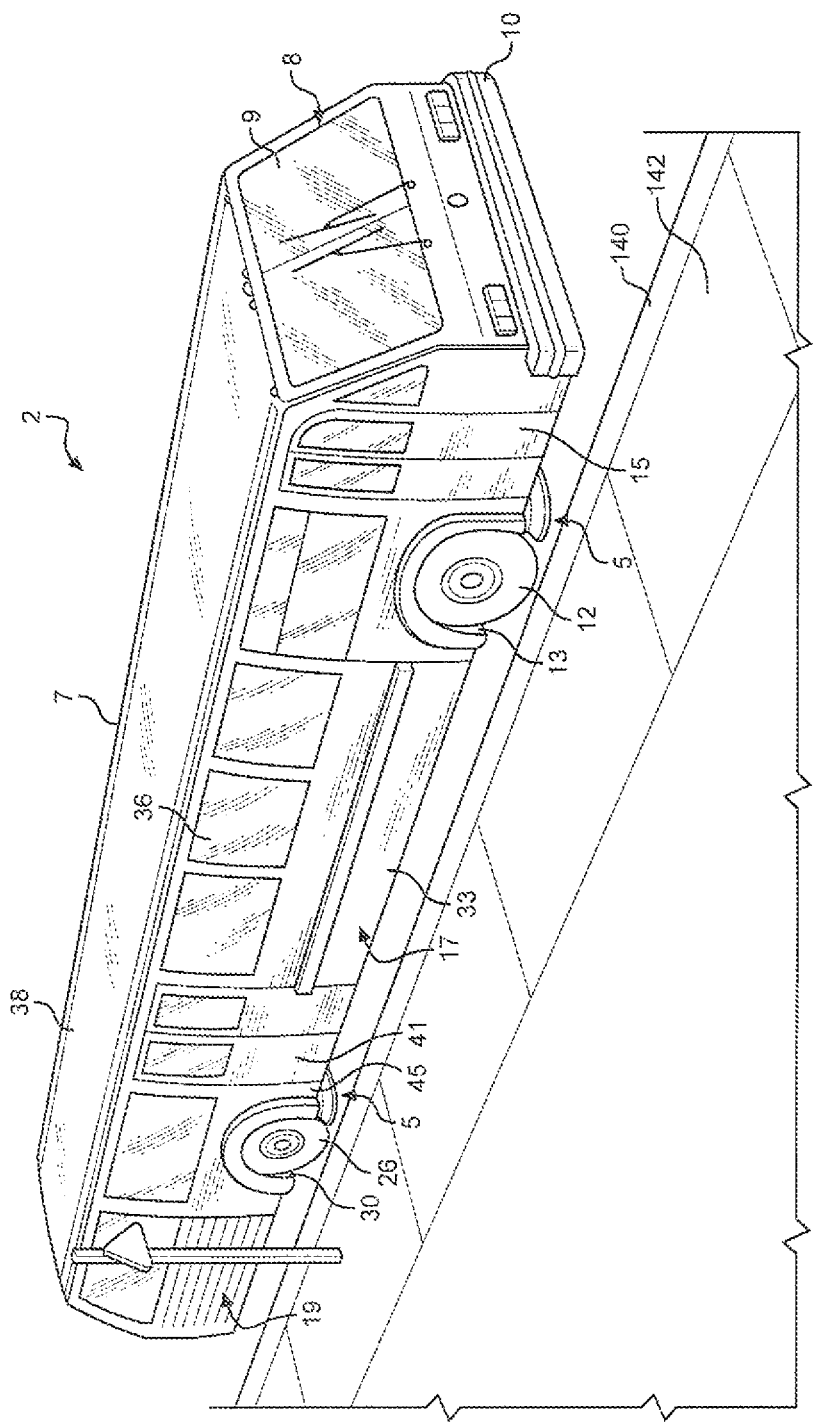
FIG. 1 is a perspective view of a transit bus having mounted thereto front and rear safety guard assemblies in accordance with the invention.

With initial reference to FIG. 1, a vehicle 2, shown as a transit bus, has attached thereto, at both fore and aft regions, a safety guard 5 constructed in accordance with the present invention. In general, vehicle 2 includes a body 7 having a front end section 8 including a windshield 9 and a bumper 10. Also provided at front end section 8 is a pair of front steerable wheels, one of which is indicated at 12 located within a wheel well 13. Arranged directly forward of wheel 12 is a forward most side door 15. Body 7 also includes a middle section 17 and a rear end section 19. Supporting rear end section 19 is a pair of rear wheels, one of which is indicated at 26 arranged in a wheel well 30 created in a side panel 33 of vehicle body 7. Also provided alongside panel 33 are various fore-to-aft spaced windows 36 which are vertically arranged below a roof 38. Shown arranged alongside panel 33, forward of rear wheel 26, is a rear door 41. In connection with describing the invention, it should be noted that safety guard 5 is arranged at a lower region 45 between wheel well 30 and rear door 41. Safety guard 5 is actually mounted at this location beneath body 7 of vehicle 2 and is supported in front of rear wheel 26 in a compliant, telescoping manner for both deflecting inanimate objects in an operational position from in front of rear wheel 26 and protecting safety guard 5 against damage by abutment with certain inanimate objects during operation of vehicle 2 as will be detailed more fully below.

Figure 2:
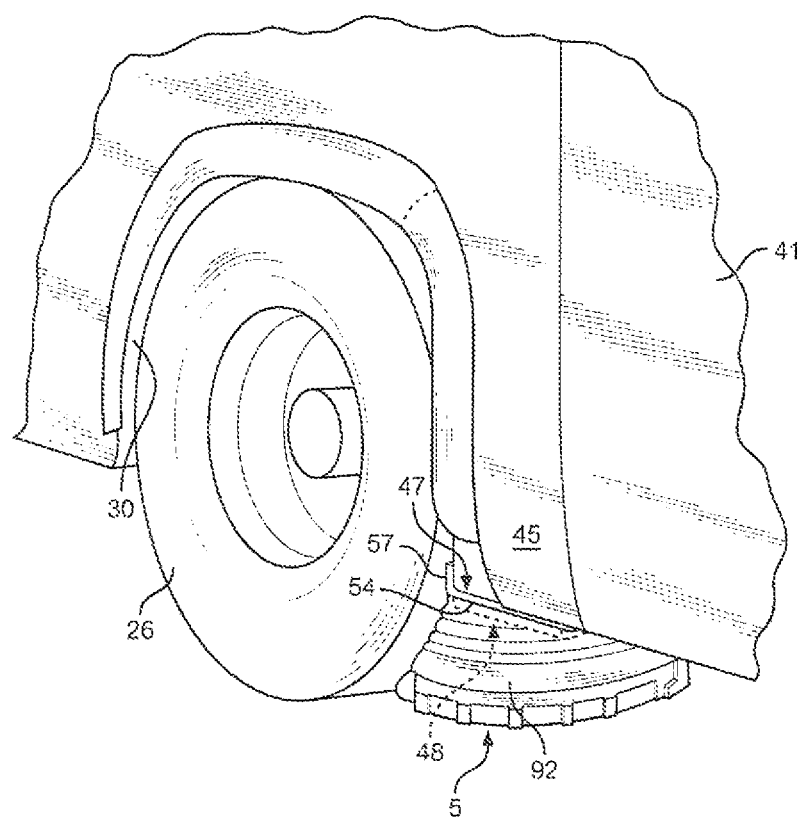
FIG. 2 is an enlarged view of the mounting of the rear safety guard assembly of FIG. 1.

At this point, it should be noted that the invention will be described with respect to a preferred mounting of safety guard 5 to vehicle body 7 in connection with rear wheel 26. However, safety guard 5 can actually be correspondingly mounted at a position in front of front wheel 12 as also shown in FIG. 1. As will also become more fully evident below, the particular mounting of safety guard 5 to body 7 can greatly vary in accordance with the present invention while accommodating the compliant, telescoping configuration referenced above. In any case, with reference to the mounting of safety guard 5 in front of rear wheel 26, FIG. 2 presents an enlarged view of lower region 45 while indicating a preferred mounting arrangement utilizing a first mounting component 47 affixed to body 7 and a second mounting component 48 affixed to safety guard 5, with these two mounting components 47, 48 being interconnected by a connection assembly generally indicated at 50 in FIG. 3.

Figure 3:
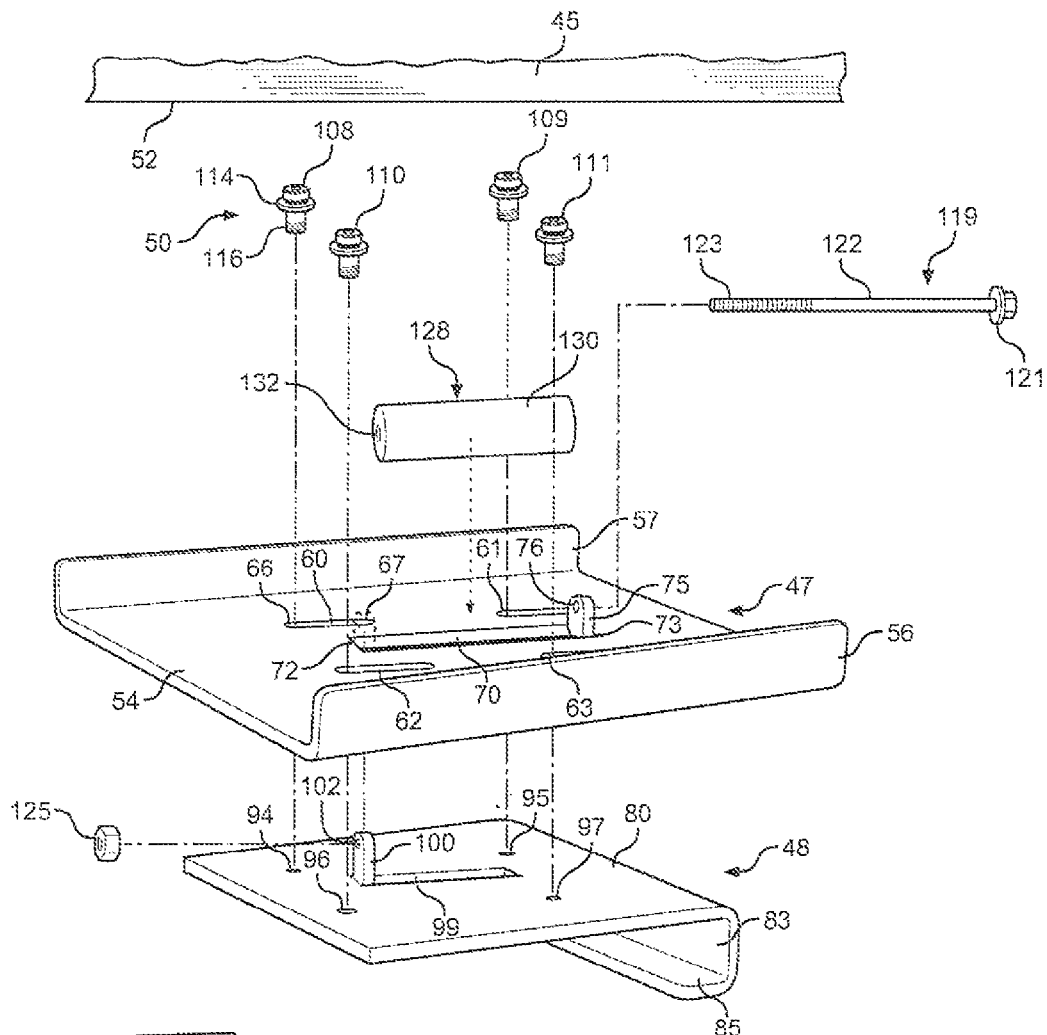
FIG. 3 is an exploded view of a safety guard mounting assembly constructed in accordance with a preferred embodiment of the invention.
Figure 3:
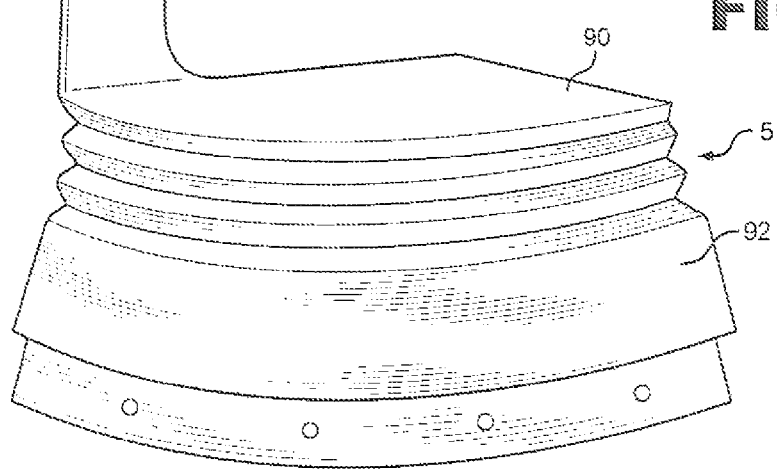

With specific reference to FIG. 3, the underside of body 7 is indicated at 52. First mounting component 47 includes a base 54 from which extend upstanding fore and aft side walls 56 and 57. Base 54 is formed with a plurality of spaced slots 60-63, each of which includes a first end 66 and a second end 67. As should be evident from viewing FIG. 3, slots 60 and 61 extend along a first axis, while slots 62 and 63 extend a second axis, with these axes being parallel to each other. Base 54 is also provided with a central, elongated slot 70 having a first end 72 and a second end 73. Projecting from second end 73 is an upstanding flange 75 of base 54. In the most preferred embodiment, upstanding flange 75 is formed by cutting a portion of base 54 and bending the same upward to establish the configuration shown in FIG. 3. However, a separate upstanding flange 75 could also be readily affixed, such as through welding, to base 54 of first mounting component 47. In any case, as shown, upstanding flange 75 is preferably formed with a through hole 76.

As also shown in FIG. 3, second mounting component 48 includes a main, upper plate 80 from which depends a side wall 83 that terminates in an in-turned leg 85. Second mounting component 48 is fixedly retained by an upper body portion 90 of safety guard 5. That is, safety guard 5 includes upper body portion 90 and a frontal guard piece 92 which is used to deflect animate objects from in front of wheels 12 and/or 26 during operation of vehicle 2 in a manner known in the art and set forth in U.S. Pat. Nos. 5,462,324 and 5,735,560, both of which are incorporated herein by reference. As the particular construction of frontal guard piece 92 is known in the art, it will not be further described herein. Instead, at this point, it should simply be realized that second mounting component 48 can be secured to upper body portion 90 in a various ways. In accordance with the most preferred form of the invention, second mounting component 48 is encapsulated in the integral molding of upper body portion 90 in a manner directly corresponding to the mounting arrangement disclosed in the '560 patent referenced above. Again, as will be more fully evident below, the particular construction and mounting of second mounting component 48 can greatly vary in accordance with the present invention such that arrangement shown in FIG. 3 is only intended to be an exemplary embodiment.

As depicted, plate 80 of second mounting component 48 includes a plurality of spaced throughholes 94-97 which are preferably threaded. In addition, plate 80 is also provided with a slot 99, the formation of which aids in establishing an upstanding tab member 100 having an associated through hole 102. When second mounting component 48 is encapsulated by safety guard 5 during manufacturing, tab member 100 extends above upper body portion 90, holes 94-97 are accessible through upper body portion 90, and both side wall 83 and leg 85 provide structural stiffness and integrity to safety guard 5.

As indicted above, first mounting component 47 is fixedly secured to the underside 52 of body 7. Again, the particular manner in which this attachment is performed can greatly vary in accordance with the present invention. In one preferred embodiment, upstanding side walls 56 and 57 are welded to underside 52. More important to the present invention is the manner in which second mounting component 48 is secured to first mounting component 47 for supporting frontal guard piece 92 yet accommodating compliant, telescoping movement of safety guard 5 relative to body 7. In particular, second mounting component 48 is positioned such that plate 80 is arranged below base 54, while upstanding tab member 100 projects into slots 70. At the same time, threaded holes 94-97 become aligned with spaced slots 60-63 respectively. Threaded fasteners 108-111 are then positioned through slots 60-63 and become threadably engaged to plate 80 at threaded holes 94-97 respectively. For this purpose, each threaded fastener 108-111 has associated therewith an upper washer 11.4, which extends about a respective slot 60-63, and a threaded end 116 which is received within a respective hole 94-97 of plate 80. With this arrangement, plate 80 is secured beneath base 54 while enabling relative sliding movement between first and second mounting components 47 and 48, with threaded fasteners 108-111 being movable between first end 66 and second end 67 of respective slots 60-63.

Connection assembly 50 also includes an elongated threaded fastener 119 having a head 121, a shaft 122 and a threaded end 123. Associated with elongated threaded fastener 119 is a nut 125. In addition, a dampening member 128 is adapted to be interposed in the connection between first mounting component 47 and second mounting component 48. In general, dampening member 128 takes the form of a spring element, which is employed to bias upstanding tab member 100 toward first end 72 of slot 70. In the embodiment shown, dampening member 128 takes the form of a cylindrical elastomeric block 130 having a through bore 132. Elongated threaded fastener 119 extends through hole 76 formed in upstanding flange 75, into through bore 132 of block 130 and finally out through hole 102 formed in tab member 100, whereat nut 125 is threaded onto threaded end 123 to secure dampening member 128 between upstanding flange 75 and upstanding tab member 100.

Figure 4:
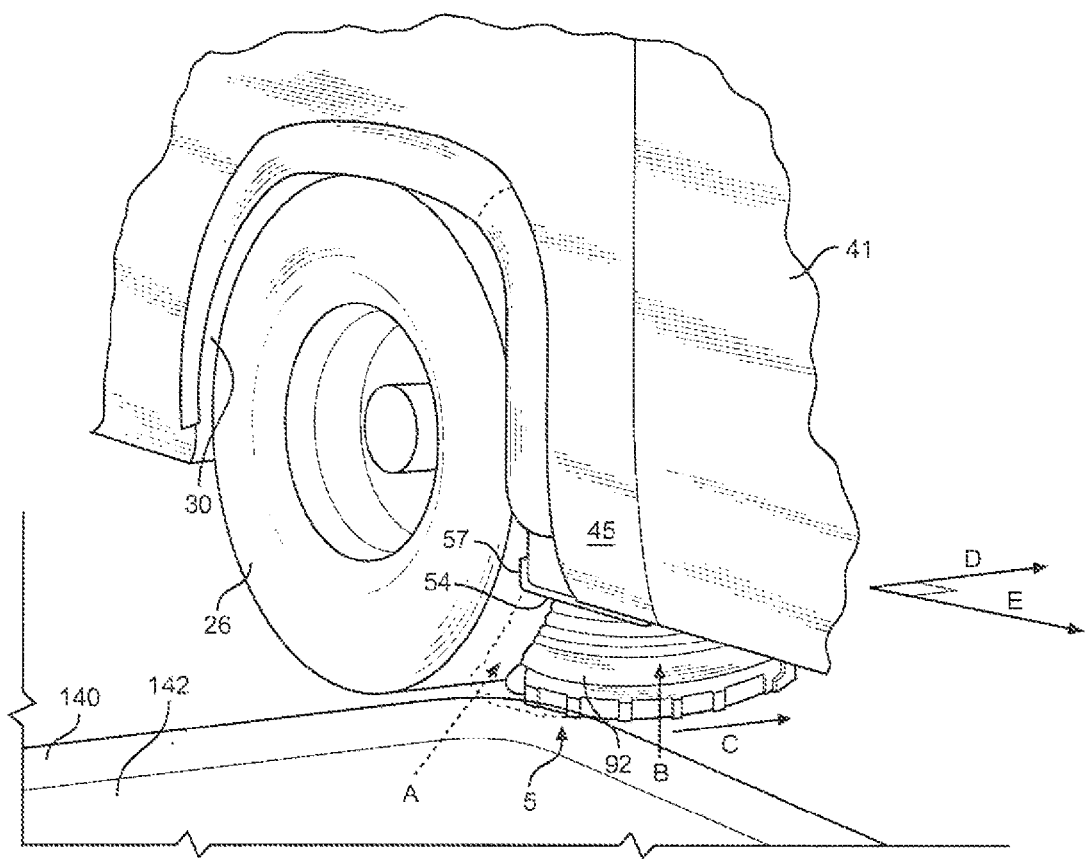
FIG. 4 is a perspective view, similar to FIG. 2, but illustrating a permissible telescoping movement for the safety guard in accordance with the invention.

With this configuration, second mounting component 48 is permitted to shift relative to first mounting component 47, while any shifting movement is resisted by the arrangement of dampening member 128. In a most preferred embodiment disclosed, slot 70 is arranged parallel to slots 60-63 so that the relative movement will occur along the axes defined by slots 60-63. In this manner, frontal guard piece 92 will assume the operational position shown in phantom at A in order to effectively deflect animate objects from in front of vehicle wheel 26 during operation of vehicle 2 while also permitting frontal guard piece 92 to be deflected in the direction of arrow C to the position shown at B in FIG. 4 if frontal guard piece 92 abuts an inanimate object with sufficient force during operation of vehicle 2 so as to prevent damage to frontal guard piece 92. More specifically, in FIG. 4, frontal guard piece 92 is shown to abut a raised curb 140 associated with a sidewalk 142 which has caused frontal guard piece 92 to shift in the direction of arrow C for a range defined by the length of slots 60-63. In the preferred embodiment of the invention, this length is in the order of 1-½ inches (approximately 2.5-3.8 cm). Shifting of second mounting component 48 relative to first mounting component 47 will result in compression of elastomeric block 130 such that, as soon as frontal guard piece 92 becomes disengaged with curb 140, frontal guard 92 will automatically shift back to the operational position indicated at A. By manually adjusting nut 125, the dampening characteristics of dampening member 128 can be readily altered.

To be most effective, frontal guard piece 92 is preferably arranged extremely close to wheel 26 in its operational position, such as within about an inch or two in front of wheel 26. To this end, the permitted shifting movement of frontal guard piece 92 upon hitting an inanimate object in accordance with the invention occurs at an angle which extends slightly forward of a transverse direction indicated at D in FIG. 4. That is, FIG. 4 indicates a transverse direction of vehicle 2 by arrow D and a forward direction of vehicle 2 by arrow E. The desired movement between second mounting component 48 and first mounting component 47 is shown to be in a direction which at least accommodates transverse movement but which prevents movement of the second mounting component 48, from the operational position, relative to the first mounting component 47 in a rearward direction of vehicle 2. Of course, the farther safety guard 5 is mounted away from wheel 26 and the permitted shifting thereof limited, some rearward movement of frontal guard piece 92 could be possible. However, in accordance with the most preferred embodiments of the invention, slots 60-63, as well as slot 70, are angled slightly forward of a transverse direction D of vehicle 2 in order to most effectively provide for deflecting animate objects from in front of wheel 26 while also protecting the frontal guard piece 92 against damage by abutment of the safety guard 5 with certain inanimate objects during operation of vehicle 2.

In connection with the embodiments disclosed, the overall safety guard is preferably formed as a one-piece unit which is mounted in front of one or more select vehicle wheels and across a portion of the underbody in the order of two feet, while having a minimal gap between the frontal safety guard and both the ground and the related wheel. The frontal guard piece can be formed of plastic, rubber, urethane, aluminum or steel, although other known materials could be used to create a physical barrier strong enough to push a child or adult from in front of the wheel. For instance, it would be possible to manufacture at least a portion of the frontal guard piece from recycled tire rubber or fiberglass. As indicated above, various mounting arrangements can be employed for the safety guard, so long as the mounting arrangements accommodate the compliant, telescoping movement described above so as to enable the safety guard to effectively deflect animate objects from in front of the wheel while also enabling the safety guard to be shifted and then automatically retracted relative to the vehicle body when a force is exerted on the safety guard by an inanimate object engaged during normal operation of the vehicle. In any case, although described with reference to preferred embodiments of the invention, it should be readily understood that various changes and/or modifications can be made to the invention without departing from spirit thereof. In general, the invention is only intended to be limited by the scope of the following claims.

I claim:
1. A vehicle comprising:
a body including at least one side panel;
a pair of front steerable wheels spaced in a transverse direction of the body of the vehicle;
at least one pair of rear wheels which are transversely spaced relative to the body and longitudinally spaced from the front steerable wheels;
a door provided along the at least one side panel; and
a safety guard assembly for deflecting animate objects from in front of one of the front and rear wheels, said safety guard assembly including:
a frontal guard piece;
a first mounting component secured to the body in front of the one of the front and rear wheels;
a second mounting component supporting the frontal guard piece; and
a connection assembly interconnecting the second mounting component to the first mounting component and securing the frontal guard piece in front of the one of the front and rear wheels such that the frontal guard piece is positioned to deflect animate objects from being run-over and crushed by the at least one of the front and rear wheels, said connection assembly being configured to accommodate transverse movement of the second mounting component relative to the first mounting component thereby permitting the frontal guard piece to shift transverse to the body upon the frontal guard piece engaging a fixed, inanimate object.

2. The vehicle according to claim 1, wherein said connection assembly includes a dampening member interposed between the first mounting component and the second mounting component.

3. The vehicle according to claim 2, wherein said damping member constitutes an elastomeric member.

4. The vehicle according to claim 2, wherein said connection assembly further including a slot formed in the first mounting component and a tab member extending from the second mounting component, said tab member projecting through and being movable within the slot.

5. The vehicle according to claim 4, wherein first mounting component is provided with a flange member, said dampening member being interposed between the tab member and the flange member.

6. The vehicle according to claim 5, wherein the connection assembly further includes a rod extending through the tab member, the dampening member and the flange member.

7. The vehicle according to claim 4, wherein the slot is angled with respect to a forward direction of the vehicle.

8. The vehicle according to claim 7, wherein the slot is angled inwardly and forwardly relative to the body.

9. The vehicle according to claim 1, wherein the first component includes a plurality of spaced slots and said connection assembly further includes a plurality of connection elements extending through the plurality of slots to define a permissible degree of movement for the frontal guard piece.

10. The vehicle according to claim 1, wherein the connection assembly is configured to prevent movement of the second mounting component relative to the first mounting component in a rearward direction of the vehicle.

11. A safety guard assembly for deflecting animate objects from in front of one of a front and rear wheels of a vehicle, said safety guard assembly including:
a frontal guard piece;

a first mounting component adapted to be secured to a body of a vehicle in front of one of the front and rear wheels of the vehicle;

a second mounting component supporting the frontal guard piece; and a connection assembly interconnecting the second mounting component to the first mounting component, said connection assembly being configured to accommodate transverse movement of the second mounting component relative to the first mounting component.

12. The safety guard assembly according to claim 11, wherein said connection assembly includes a dampening member interposed between the first mounting component and the second mounting component.

13. The safety guard assembly according to claim 12, wherein said damping member constitutes an elastomeric member.

14. The safety guard assembly according to claim 12, wherein said connection assembly further including a slot formed in the first mounting component and a tab member extending from the second mounting component, said tab member projecting through and being movable within the slot.

15. The safety guard assembly according to claim 14, wherein first mounting component is provided with a flange member, said dampening member being interposed between the tab member and the flange member.

16. The safety guard assembly according to claim 15, wherein the connection assembly further includes a rod extending through the tab member, the dampening member and the flange member.

17. The safety guard assembly according to claim 11, wherein the first component includes a plurality of spaced slots and said connection assembly further includes a plurality of connection elements extending through: the plurality of slots to define a permissible degree of movement for the frontal guard piece.

* * * * *